United States Patent
Kang et al.

(10) Patent No.: US 8,840,326 B2
(45) Date of Patent: Sep. 23, 2014

(54) LENS BARREL ASSEMBLY AND PHOTOGRAPHING APPARATUS INCLUDING THE SAME

(71) Applicant: Samsung Electronics Co., Ltd., Suwon-si (KR)

(72) Inventors: Yoon-seok Kang, Seoul (KR); Kyeong-eun Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 13/874,647

(22) Filed: May 1, 2013

(65) Prior Publication Data
US 2014/0079384 A1    Mar. 20, 2014

(30) Foreign Application Priority Data
Sep. 17, 2012 (KR) .................. 10-2012-0102994

(51) Int. Cl.
G03B 17/00 (2006.01)
G03B 17/56 (2006.01)
G02B 7/10 (2006.01)
G02B 7/02 (2006.01)

(52) U.S. Cl.
CPC .............. *G02B 7/02* (2013.01); *G03B 17/565* (2013.01); *G02B 7/10* (2013.01)
USPC .......................................... 396/529

(58) Field of Classification Search
USPC .......................................... 396/529
See application file for complete search history.

(56) References Cited

U.S. PATENT DOCUMENTS

| | | | | |
|---|---|---|---|---|
| 5,812,325 | A * | 9/1998 | Nomura et al. | 359/700 |
| 6,437,924 | B1 | 8/2002 | Azegami | |
| 6,456,445 | B2 * | 9/2002 | Nomura et al. | 359/699 |
| 6,624,955 | B2 * | 9/2003 | Nomura et al. | 359/823 |
| 6,853,499 | B2 * | 2/2005 | Iwasaki | 359/694 |

(Continued)

FOREIGN PATENT DOCUMENTS

| | | |
|---|---|---|
| GB | 20309548 A | 7/1997 |
| JP | 2011-158713 A | 8/2011 |
| JP | 2012-137748 A | 7/2012 |

OTHER PUBLICATIONS

PCT Search Report and Written Opinion established for PCT/KR2013/004395 (Aug. 26, 2013).

(Continued)

*Primary Examiner* — Rodney Fuller
(74) *Attorney, Agent, or Firm* — Drinker Biddle & Reath LLP

(57) ABSTRACT

A lens barrel assembly includes: a lens group; a lens barrel that support the lens group and includes, on an outer circumferential surface thereof, a first movement pin projected outwardly and a second guide groove that is extended along a circumferential direction; and an outer barrel disposed outside the lens barrel and includes, on an inner circumferential surface thereof, a first guide groove extended along the circumferential direction to be coupled with the first movement pin, and a second movement pin that is projected inwardly to be coupled with the second guide groove, where the lens barrel is moved in an optical axis direction as the outer barrel rotates, and where a movement section of the lens barrel comprises a first movement section, a second movement section, and an intersection movement section that connects the first movement section with the second movement section.

14 Claims, 11 Drawing Sheets

(56) References Cited

U.S. PATENT DOCUMENTS

| | | | |
|---|---|---|---|
| 6,909,464 B2 * | 6/2005 | Nomura et al. | 348/357 |
| 7,088,524 B2 * | 8/2006 | Nomura et al. | 359/700 |
| 7,131,772 B2 * | 11/2006 | Nomura | 396/349 |
| 7,806,607 B2 * | 10/2010 | Iyoda et al. | 396/529 |
| 8,300,334 B2 * | 10/2012 | Takahashi | 359/825 |
| 2002/0149859 A1 * | 10/2002 | Muto et al. | 359/694 |
| 2004/0042089 A1 | 3/2004 | Nomura | |
| 2006/0007565 A1 | 1/2006 | Eto | |
| 2010/0142939 A1 * | 6/2010 | Honsho et al. | 396/529 |
| 2010/0232036 A1 | 9/2010 | Ishizuka | |
| 2012/0105985 A1 | 5/2012 | Kang | |
| 2012/0162782 A1 | 6/2012 | Zou et al. | |
| 2013/0083410 A1 | 4/2013 | Chiang | |

OTHER PUBLICATIONS

Search Report issued for EP No. 13177914.2, Dec. 10, 2013.

* cited by examiner

FIRST MOVEMENT SECTION

SECOND MOVEMENT SECTION

INTERSECTION MOVEMENT SECTION

FIRST MOVEMENT SECTION

INTERSECTION MOVEMENT SECTION

SECOND MOVEMENT SECTION

LENS BARREL ASSEMBLY AND PHOTOGRAPHING APPARATUS INCLUDING THE SAME

CROSS-REFERENCE TO RELATED PATENT APPLICATION

This application claims the priority benefit of Korean Patent Application No. 10-2012-0102994, filed on Sep. 17, 2012, in the Korean Intellectual Property Office, the entirety of which is incorporated herein by reference.

BACKGROUND

1. Field

Various embodiments of the invention relate to a lens barrel assembly and a photographing apparatus including the same, and more particularly, to a zoom lens barrel assembly having a small thickness in a storage state and providing a zoom function with a high magnification and a photographing apparatus including the zoom lens barrel assembly.

2. Description of Related Art

Lens barrel assemblies mounted on photographing apparatuses such as digital cameras and camcorders embody optical systems having various focal lengths by controlling a distance between lens groups. Since the optical systems of cameras may be converted into wide-angle lenses or telephoto lenses by using lens barrel assemblies, users may take photographs with various viewing angles while standing still at the same spot.

To control a distance between lens groups, relative locations of barrels supporting lens groups should be changed. When photographs are not taken, elements of barrel assemblies are stored in bodies of cameras. To provide compact cameras having small thicknesses in response to market demands, thicknesses of barrel assemblies in a storage state should be reduced. Recently, since a high performance zoom function is also needed in compact cameras, barrel assemblies should not only have a small thickness but also provide the high performance zoom function. However, since it is possible to move lens groups in a barrel assembly within a previously determined range of a stroke length, it is essential to provide spaces for installing a guide groove or a hole with a certain length on the elements. Due to this, the reduction of thicknesses of barrel assemblies may be limited.

SUMMARY

Various embodiments provide a lens barrel assembly that not only has a small thickness in a storage state but also provides a zoom function with a high magnification.

Various embodiments also provide an improved degree of freedom in a design for a guide groove on an outer barrel to guide a movement of a lens barrel.

Various embodiments also provide improved size accuracy.

According to an embodiment, a lens barrel assembly is provided. The lens barrel assembly includes a lens group, a lens barrel that supports the lens group and includes, on an outer circumferential surface thereof, a first movement pin projected outwardly and a second guide groove that is separate from the first movement pin and is extended along a circumferential direction, and an outer barrel disposed outside the lens barrel and includes, on an inner circumferential surface thereof, a first guide groove extended along the circumferential direction to be coupled with the first movement pin and a second movement pin that is separate from the first guide groove and is projected inwardly to be coupled with the second guide groove. The lens barrel is moved in an optical axis direction as the outer barrel rotates. A movement section of the lens barrel includes a first movement section in which the first movement pin is moved while being guided by the first guide groove, a second movement section in which the second guide groove is moved while being guided by the second movement pin, and an intersection movement section that connects the first movement section with the second movement section.

In the first movement section, the first movement pin may be engaged with the first guide groove and the second movement pin may not be engaged with the second guide groove.

In the second movement section, the second movement pin may be engaged with the second guide groove and the first movement pin may not be engaged with the first guide groove.

In the intersection movement section, the second movement pin may be engaged with the second guide groove before the first movement pin is released from the first guide groove, and the first movement pin may be engaged with the first guide groove before the second movement pin is released from the second guide groove.

A distance between the first movement pin and the second guide groove in the circumferential direction may be equivalent to a distance between the second movement pin and the first guide groove in the circumferential direction.

The first movement section may define the lens barrel operating in a wide-angle mode, and the second movement section may define the lens barrel operating in a telephoto mode.

The lens barrel may be moved linearly along the optical axis direction, and the outer barrel may rotate around an optical axis.

The assembly may further include a rectilinear motion guide member disposed between the lens barrel and the outer barrel, and the rectilinear motion guide member may guide a linear movement of the lens barrel.

The rectilinear motion guide member may include at least one notch portion extended in the optical axis direction, and the lens barrel may include at least one projection corresponding to the at least one notch portion. The projection may be moved linearly while being guided by the incision portion.

A plurality of the first movement pins and a plurality of the second guide grooves may be formed on the outer circumferential surface of the lens barrel along the circumferential direction, and a plurality of the second movement pins and a plurality of the first guide grooves may be formed on the inner circumferential surface of the outer barrel along the circumferential direction.

The assembly may further include a reflecting portion with sequential shapes between the plurality of the first guide grooves.

According to another embodiment, a photographing apparatus is provided. The apparatus includes a lens group, a lens barrel that supports the lens group and includes, on an outer circumferential surface thereof, a first movement pin projected outwardly and a second guide groove that is separate from the first movement pin and is extended along a circumferential direction, an outer barrel disposed outside the lens barrel and includes, on an inner circumferential surface thereof, a first guide groove extended along the circumferential direction to be coupled with the first movement pin and a second movement pin that is separate from the first guide groove and is projected inwardly to be coupled with the second guide groove, and an imaging device that receives light passing through the lens group and generates an electric signal. The lens barrel is moved in an optical axis direction as the outer barrel rotates. A movement section of the lens barrel includes a first movement section in which the first movement pin is moved while being guided by the first guide groove, a second movement section in which the second guide groove is moved while being guided by the second movement pin, and an intersection movement section that connects the first movement section with the second movement section.

BRIEF DESCRIPTION OF THE DRAWINGS

The above and other features and advantages will become more apparent by describing in detail exemplary embodiments thereof with reference to the attached drawings in which.

DETAILED DESCRIPTION

Hereinafter, configurations and operations of a lens barrel assembly 1 and a photographing apparatus including the same according to an embodiment will be described with reference to the attached drawings.

Figure 1:
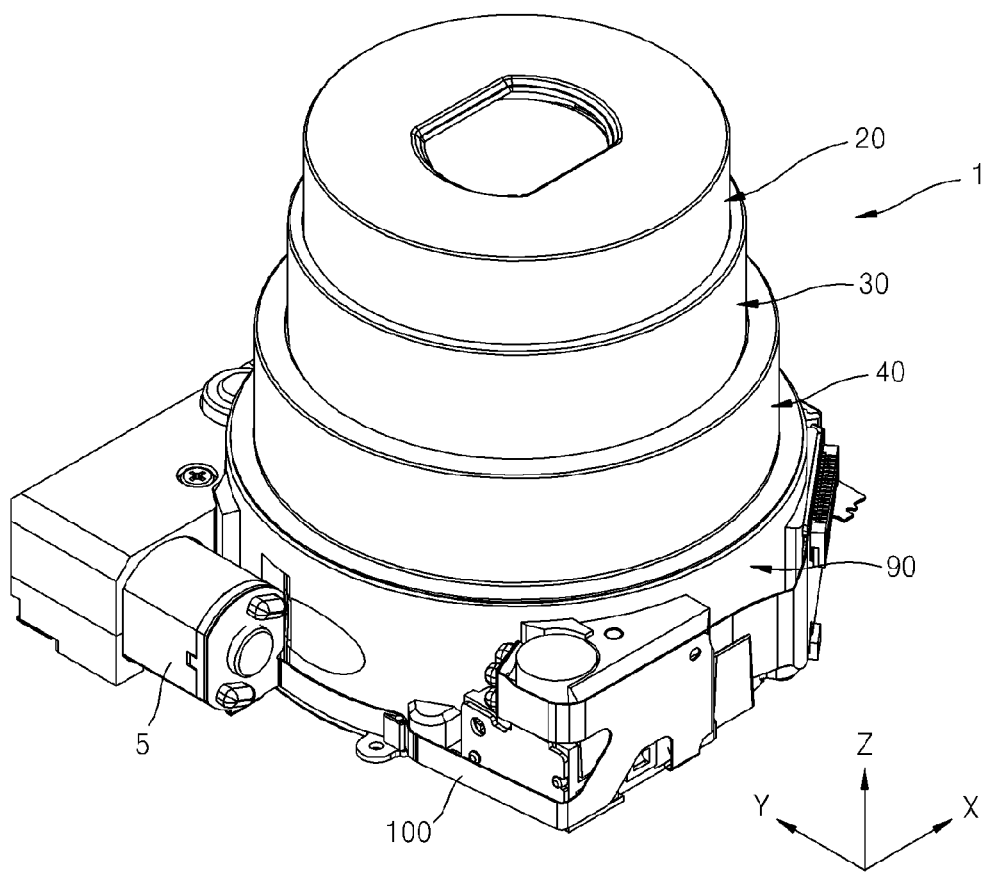
FIG. 1 is a perspective view illustrating a lens barrel assembly and a photographing apparatus including the same, according to an embodiment.
Figure 2:
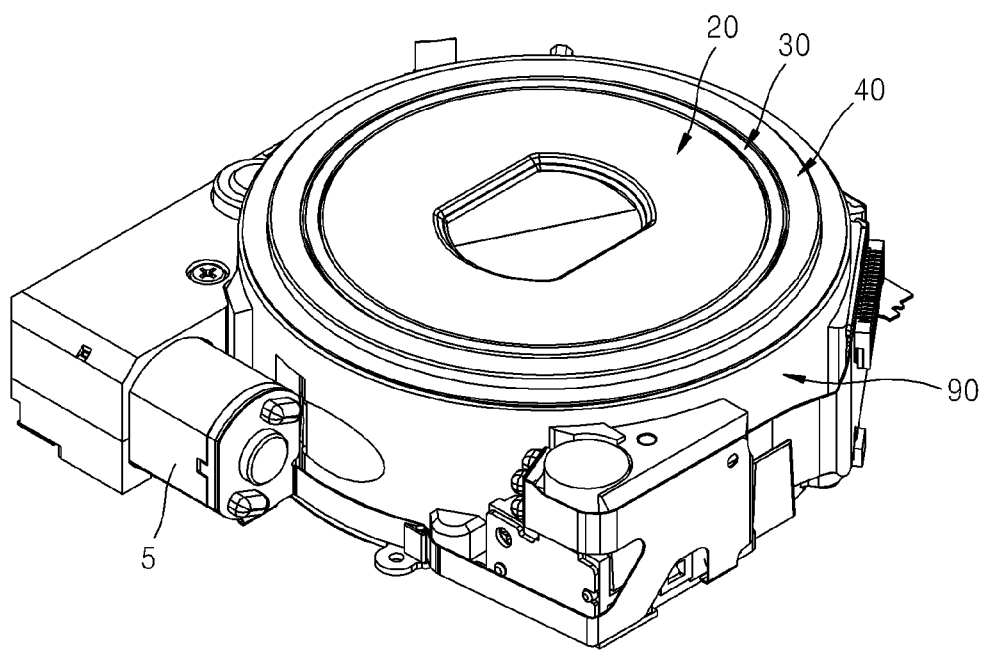
FIG. 2 is a perspective view illustrating a storage state of the lens barrel assembly of FIG. 1.

FIG. 1 is a perspective view illustrating the lens barrel assembly 1 and the photographing apparatus including the same, according to an embodiment. FIG. 2 is a perspective view illustrating a storage state of the lens barrel assembly 1.

Figure 3:
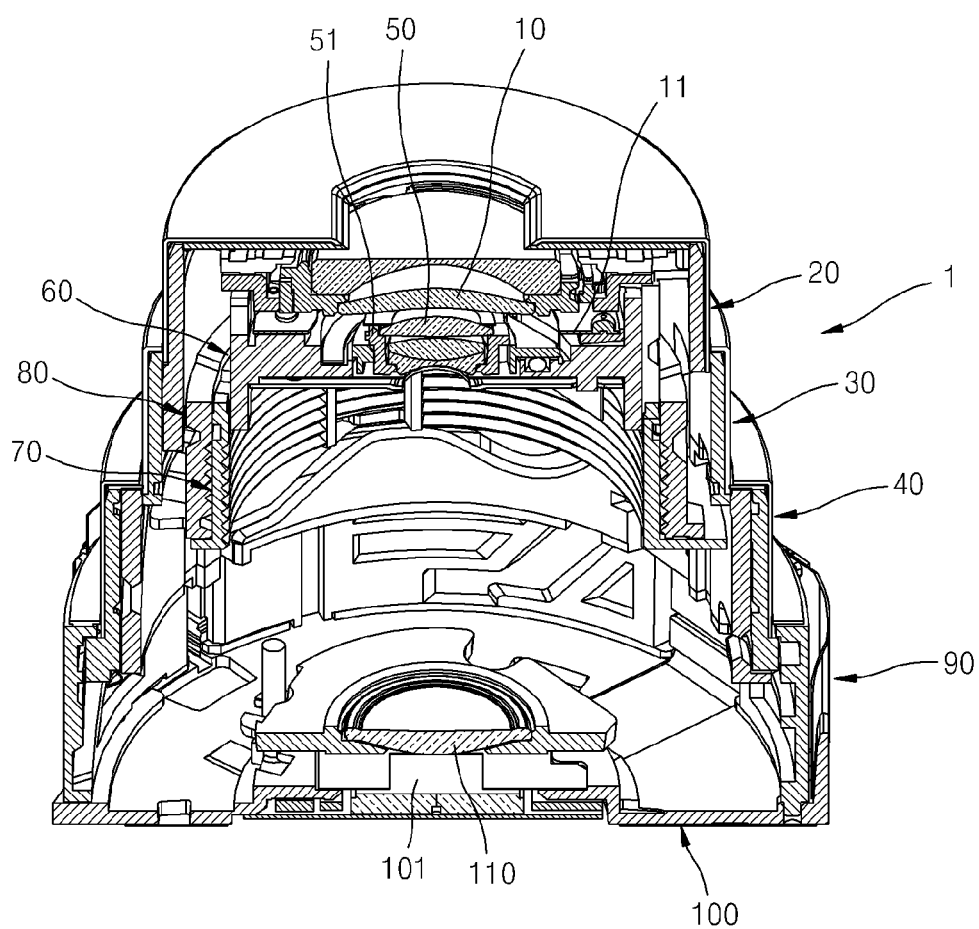
FIG. 3 is a cross-sectional perspective view illustrating the photographing apparatus of FIG. 1.

The photographing apparatus includes the lens barrel assembly 1 and an imaging device 101 (refer to FIG. 3). When the photographing apparatus is not being operated, the lens barrel assembly 1, as shown in FIG. 2, may be stored inside the photographing apparatus. When the photographing apparatus is being operated, the lens barrel assembly 1, as shown in FIG. 1, may be moved along in an optical axis (a direction of Z axis) to be projected forward.

The lens barrel assembly 1 is projected from the photographing apparatus and expands, optical lenses (not shown) of the lens barrel assembly 1 may be moved along the optical axis direction. Accordingly, the lens barrel assembly 1 performs a zoom operation of adjusting a magnification of an image of an object and a focus adjusting operation of adjusting a focus on the object.

In the present embodiment, the lens barrel assembly 1 is operated to unfold in three-steps and performs an optical zoom function. The lens barrel assembly 1 includes an outer cylinder 90 installed on a base 100, a second cylinder 40 disposed on the outer cylinder 90 to be movable, a first cylinder 30, and a first lens barrel 20. The second cylinder 40 is disposed to move forward or backward from the outer cylinder 90 along the optical axis direction (the direction of Z axis), and the first cylinder 30 is disposed to move forward or backward from the second cylinder 40 along the optical axis direction. Also, the first lens barrel 20 is disposed to move forward or backward from the first cylinder 30 along the optical axis direction. In the lens barrel assembly 1 with such configuration, the first lens barrel 20, the first cylinder 30, and the second cylinder 40 may move along the optical axis direction from the outer cylinder 90 fixed to the base 100. However, the configuration of the lens barrel assembly 1 is not limited to the three tiers and may be operated to unfold to two steps or four or more steps to perform a zoom function.

On outer surfaces of the base 100 and the outer cylinder 90, there may be disposed a driving unit 5 that generates a driving force to perform a zoom function.

The photographing apparatus including the lens barrel assembly 1 with the described configuration may include, for example, a digital still camera photographing a still image, a digital camcorder photographing a moving image, and a camera module installed on a portable mobile device.

In the present embodiment shown in FIGS. 1 and 2, the lens barrel assembly 1 is manufactured as a fixed-barrel type in which the lens barrel assembly 1 is fixed to the photographing apparatus, but embodiments are not limited thereto.

Accordingly, the lens barrel assembly 1 may be manufactured as an exchangeable-barrel type in which the lens barrel assembly 1 may be separated from or mounted on the photographing apparatus.

Figure 4:
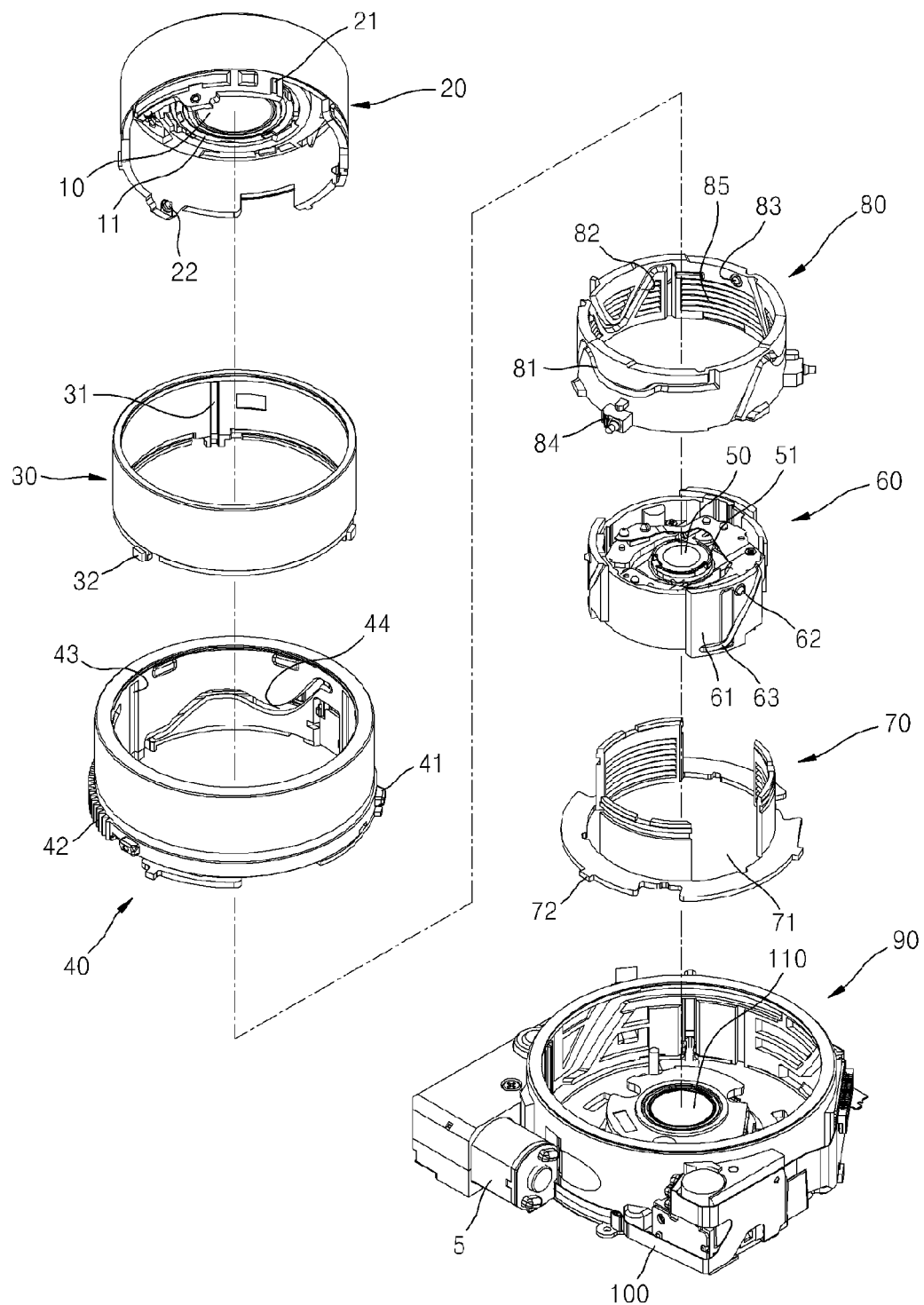
FIG. 4 is an exploded perspective view illustrating the lens barrel assembly of FIG. 1.

FIG. 3 is a cross-sectional perspective view illustrating the photographing apparatus of FIG. 1, and FIG. 4 is an exploded perspective view illustrating separated elements of the lens barrel assembly 1 of FIG. 1.

Referring to FIGS. 3 and 4, the lens barrel assembly 1 includes the first lens barrel 20 supporting a first lens group 10, the first cylinder 30 disposed outside the first lens barrel 20, a second lens barrel 60 supporting a second lens group 50, an outer barrel 80 disposed between the first lens barrel 20 and the second lens barrel 60, the second cylinder 40 disposed outside the first cylinder 30 and supporting the first cylinder 30 and the outer barrel 80 to be movable, and the outer cylinder 90 disposed outside the second cylinder 40. The outer cylinder 90 functions as a supporting structure for maintaining a fixed state of the lens barrel assembly 1.

When the lens barrel assembly 1 is being operated to perform a zoom operation, the first lens barrel 20 is projected to the front in the optical axis direction (the direction of Z-axis). The first lens barrel 20 is formed in the shape of a hollow cylinder and supports the first lens group 10. A first projection 21 may be provided on an outer circumferential surface of the first lens barrel 20 and projects outwardly, and a second projection 22 may be provided on an inner circumferential surface thereof and projects inwardly. The first lens group 10 is coupled with a front of the first lens barrel 20 interposing a lens supporting portion 11 therebetween. The first lens barrel 20 moves forward or backward along the optical axis direction, thereby adjusting a location of the first lens group 10 in the optical axis direction.

The first cylinder 30 is formed in the shape of a hollow cylinder and is disposed outside the first lens barrel 20. A straight groove 31 is formed straightly along the optical axis direction on an inner circumferential surface of the first cylinder 30. The first projection 21 of the first lens barrel 20 is inserted into the straight groove 31 of the first cylinder 30, thereby limiting a movement of the first lens barrel 20 in a circumferential direction. A third projection 32 is provided on an outer circumferential surface of the first cylinder 30.

The second cylinder 40 is disposed outside the first cylinder 30. The second cylinder 40 is formed in the shape of a hollow cylinder. On an inner circumferential surface of the second cylinder 40, a straight groove 43 is formed straightly along the optical axis direction, and an inner guide groove 44 is extended in a circumferential direction and is inclined along the optical axis direction. A gear 42 extended in the circumferential direction is installed on an outer circumferential surface of the second cylinder 40. Since the gear 42 is connected to the driving unit 5 shown in FIG. 1, a driving force generated by the driving unit 5 is transferred to the gear 42 to allow the second cylinder 40 to rotate relative to the outer cylinder 90. Although not shown in the drawing, the second cylinder 40 may be divided into an outer shell and an inner shell. The gear 42 may be formed on the outer shell, and the straight groove 43 and the inner guide groove 44 may be formed on the inner shell. Accordingly, although the outer shell where the gear 42 is formed rotates, the inner shell where the straight groove 43 and the inner guide groove 44 are formed may not rotate. The second cylinder 40 is disposed inside the outer cylinder 90 and may be coupled with the outer cylinder 90 using a fourth projection 41.

The outer cylinder 90 is coupled to the base 100, and the imaging device 101, which converts light passing through the first lens group 10 and the second lens group 50 into an electrical signal, is disposed on the base 100. The imaging device 101 is disposed in a location corresponding to the first lens group 10 and the second lens group 50. The imaging device 101 may be a photoelectric conversion device such as a charge coupled device (CCD) and a complementary metal oxide semiconductor (CMOS).

Between the imaging device 101 and the second lens group 50, an image-forming lens 110 is disposed. The image-forming lens 110 may be moved along the optical axis direction to execute a focus adjustment function.

The outer barrel 80 may be formed in the shape of a hollow cylinder and may be disposed inside the first lens barrel 20. An outer guide groove 81 is provided on an outer circumferential surface of the outer barrel 80, is inclined along the optical axis direction, and is extended along a circumferential direction to allow the second projection 22 of the first lens barrel 20 to be inserted thereinto. The outer guide groove 81 guides a movement of the second projection 22 to allow the first lens barrel 20 to perform a rectilinear motion along the optical axis direction. Also, on the outer circumferential surface of the outer barrel 80, a sixth projection 84 is provided. The sixth projection 84 is inserted into the inner guide groove 44 formed on the inner circumferential surface of the second cylinder 40 and is guided by the inner guide groove 44.

Inside the outer barrel 80, the second lens barrel 60 is provided to be movable. The second lens barrel 60 supports the second lens group 50. The second lens group 50 is coupled to the second lens barrel 60 interposing a lens supporting portion 51. Since the second lens barrel 60 is movable inside the outer barrel 80 along the optical axis direction, a location of the second lens group 50 relative to the image-forming lens 110 in the optical axis direction may be changed, thereby providing a zoom function.

The second lens barrel 60 may perform a rectilinear motion along the optical axis direction due to the outer barrel 80. To allow the second lens barrel 60 to perform the rectilinear motion along the optical axis direction without rotating, a projection 61 may be formed on an outer circumferential surface of the second lens barrel. A rectilinear motion guide member 70 may be disposed between the second lens barrel 60 and the outer barrel 80, and the rectilinear motion guide member 70 guides the second lens barrel 60 to perform a motion in the optical axis direction.

The rectilinear motion guide member 70 includes a notch portion 71. The notch portion 71 is formed to extend parallel to the optical axis direction. The projection 61 of the second lens barrel 60 is coupled to the notch portion 71 formed to extend parallel to the optical axis direction to allow the second lens barrel 60 to perform a rectilinear motion along the optical axis direction without rotating. The rectilinear motion guide member 70 includes a fifth projection 72. The fifth projection 72 may be coupled to the straight groove 43, which is formed on the inner circumferential surface of the second cylinder 40 and extends parallel to the optical axis direction. The rectilinear motion guide member 70 is thus coupled to the straight groove 43, thereby fixing a location thereof in a circumferential direction. Since the second lens barrel 60 is coupled to the notch portion 71 of the rectilinear motion guide member 70, a location of the second lens barrel 60 may be fixed in the circumferential direction in the same manner as the rectilinear motion guide member 70.

Figure 5:
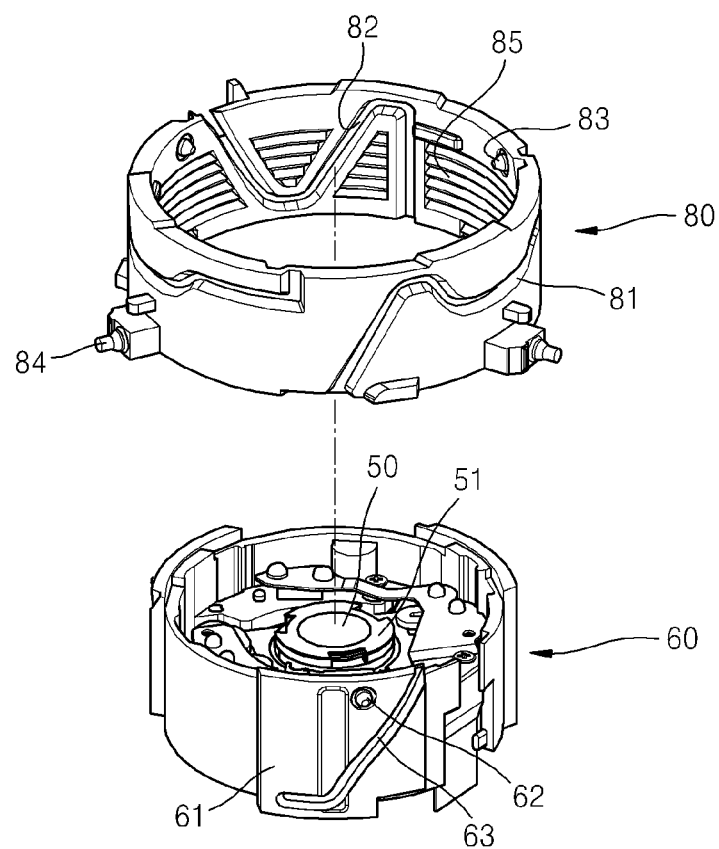
FIG. 5 is an exploded perspective view illustrating the second lens barrel and the outer barrel shown in FIG. 4.
Figure 6:
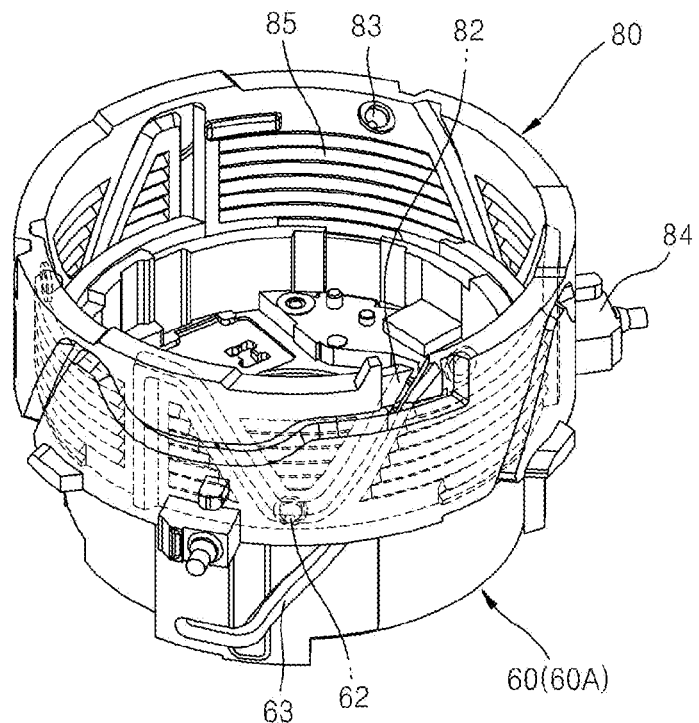
FIGS. 6 to 8 are perspective views illustrating operation states of the second lens barrel and the outer barrel of FIG. 5.
Figure 7:
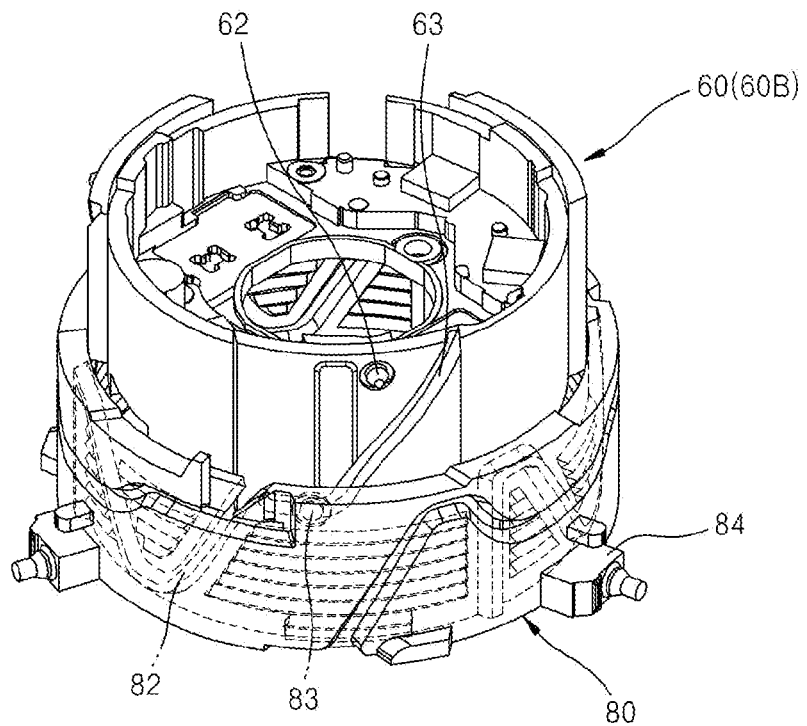
Figure 8:
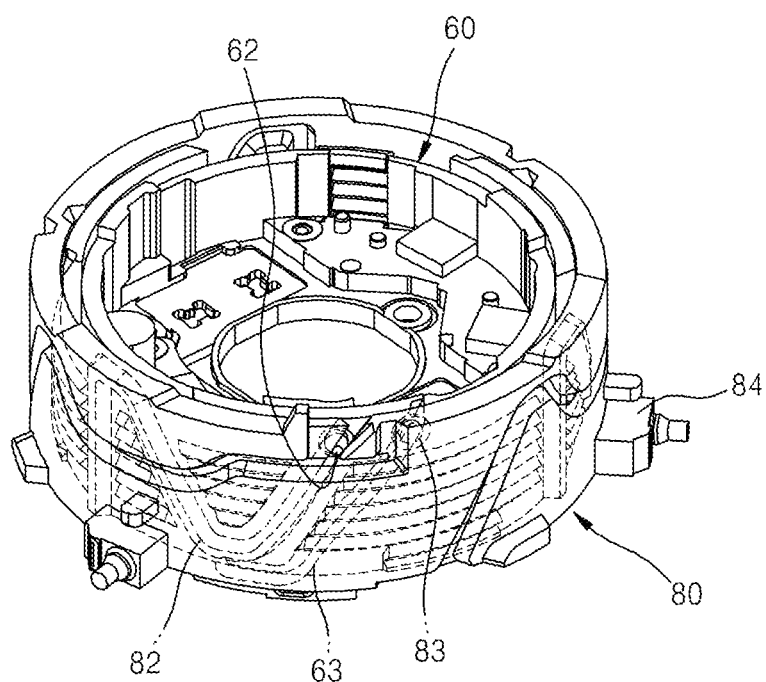

FIG. 5 is an exploded perspective view illustrating the second lens barrel 60 and the outer barrel 80, and FIGS. 6 to 8 are perspective views illustrating operation states of the second lens barrel 60 and the outer barrel 80.

Referring to FIG. 5, on the outer circumferential surface of the second lens barrel 60, a first movement pin 62 is formed to project outward and a second guide groove 63 separate from the first movement pin 62 is formed to extend along a circumferential direction. On an inner circumferential surface of the outer barrel 80, a first guide groove 82 is formed to extend along the circumferential direction and a second movement pin 83 separate from the first guide groove 82 is formed to project inward. In other words, a guide groove guiding relative motions of the second lens barrel 60 and the outer barrel 80 is divided into two guide grooves: the first guide groove 82 and the second guide groove 63, which are formed on the outer barrel 80 and the second lens barrel 60, respectively.

Since the guide groove guiding relative motions of the second lens barrel 60 and the outer barrel 80 is divided into the first guide groove 82 and the second guide groove 63, it thereby reduces a height (thickness) of the outer barrel 80 in the optical axis direction. When the guide groove is not divided and is sequentially formed on the outer barrel 80, the height of the outer barrel 80 should be greater than heights of sequential guide grooves. Particularly, when the sequential guide groove guides the second lens barrel 60 to a wide-angle position and a telephoto position, the height of the outer barrel 80 should be greater than a difference of heights of the wide-angle position and the telephoto position. However, in the present embodiment, the guide grove is divided into the first guide groove 82 and the second guide groove 63 (the first guide groove 82 is formed on the outer barrel 80 and the second guide groove 63 is formed on the second lens barrel 60, respectively), thereby decreasing the height of the outer barrel 80 to correspond to the height of the first guide groove 82. In this case, the wide-angle position indicates a position where a distance between the second lens group 50 and the image-forming lens 110 is the shortest among movement positions of the second lens barrel 60 in the optical axis direction. The telephoto position indicates a position where a distance between the second lens group 50 and the image-forming lens 110 is the longest among movement positions of the second lens barrel 60 in the optical axis direction.

The second lens barrel 60 is moved in the optical axis direction as the outer barrel 80 rotates. The movement of the second lens barrel 60 is determined by the first guide groove 82 and the second guide groove 63 separately from each other. A movement section of the second lens barrel 60 includes a first movement section, a second movement section, and an intersection movement section.

Referring to FIG. 6, the first movement pin 62 is guided and moved by the first guide groove 82 in the first movement section. The outer barrel 80 rotates while first movement pin 62 is being engaged with the first guide groove 82 such that the second lens barrel 60 is moved along the first guide groove 82. In this case, the second movement pin 83 is not being engaged with the second guide groove 63. The first movement section may be a wide-angle section including a wide-angle position 60A where a distance between the second lens group 50 and the image-forming lens 110 is the shortest.

Referring to FIG. 7, the second guide groove 63 is guided and moved by the second movement pin 83 in the second movement section. The outer barrel 80 rotates while the second guide groove 63 is being engaged with the second movement pin 83 such that the second lens barrel 60 is moved by the second movement pin 83. In this case, the first movement pin 62 is not being engaged with the first guide groove 82. The second movement section may be a telephoto section including a telephoto position 60B where the distance between the second lens group 50 and the image-forming lens 110 is the longest.

Referring to FIG. 8, the intersection movement section connects the first movement section with the second movement section. In the intersection movement section, the second movement pin 83 is engaged with the second guide groove 63 before the first movement pin 62 is released from the first guide groove 82, and the first movement pin 62 is engaged with the first guide groove 82 before the second movement pin 83 is released from the second guide groove 63. Through this configuration, it is possible to smoothly move the second lens barrel 60 from the first movement section to the second movement section or from the second movement section to the first movement section.

There may be a plurality of the first movement pin 62, a plurality of second movement pin 83, a plurality of the first guide groove 82, and a plurality of the second guide groove 83 to ensure the movement of the second lens barrel 60 and the outer barrel 80. For example, as shown in FIG. 5, three first guide grooves 82 and the three second movement pins 83 are each separately formed on the inner circumferential surface of the outer barrel 80 along the circumferential direction, and according thereto, three second guide grooves 63 and three first movement pins 62 are each separately formed on the outer circumferential surface of the second lens barrel 60 along the circumferential direction.

On the inner circumferential surface of the outer barrel 80, a reflecting portion 85 may be formed to prevent light incident from the outside from being incident to the image-forming lens 110. The reflecting portion 85 may be formed in sequential shapes, or adjacent shapes having similar width in the optical axis direction, disposed between the first guide grooves 82, and this configuration allows more effective prevention of the outside incident light than a configuration of forming both a first guide groove and a second guide groove on the outer barrel 80.

Figure 9:
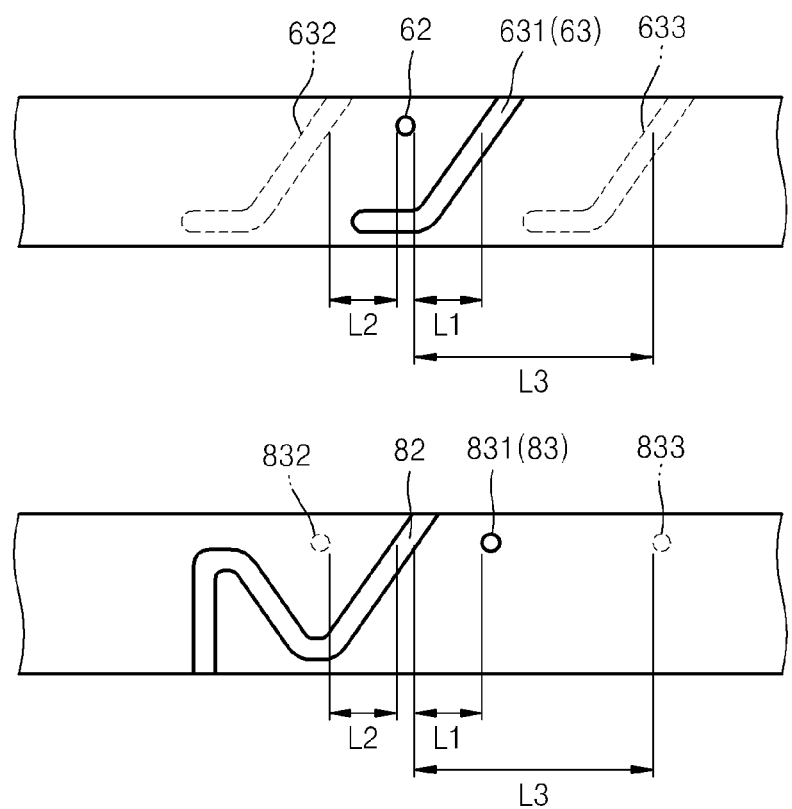
FIG. 9 is a schematic diagram illustrating a planar figure showing locations of a first movement pin with respect to a second guide groove of the second lens barrel and locations of a second movement pin with respect to a first guide groove of the outer barrel of the lens barrel assembly shown in FIG. 4.

FIG. 9 is a schematic diagram illustrating a planar figure showing locations of the first movement pin 62 with respect to the second guide groove 63 of the second lens barrel 60 and the second movement pin 83 with respect to the first guide groove 82 of the outer barrel 80 of the lens barrel assembly shown in FIG. 4. In FIG. 9, for convenience of description, an outer surface of the second lens barrel 60 and an inner surface of the outer barrel 80, facing each other, are shown in the same plane.

In the present embodiment, the first guide groove 82 and the second guide groove 63 are respectively formed on the inner circumferential surface of the outer barrel 80 and the outer circumferential surface of the second lens barrel 60, which are separate members, thereby increasing the degree of freedom in design.

When the first guide groove 82 and the second guide groove 63 are provided on one member instead of separate members, for example, on the outer barrel 80, an interference may occur between the first guide groove 82 and the second guide groove 63. Particularly, when forming a plurality of pairs of the first guide grooves 82 and the second guide grooves 63, it is very complicated to form the pluralities of the first guide grooves 82 and the second guide grooves 63 so as not to interfere one another, which is a considerable burden when designing an outer barrel. However, in the present embodiment, the first guide groove 82 and the second guide groove 63 are respectively formed on separate members (the second lens barrel 60 and the outer barrel 80) in such a way that it is not necessary to consider whether there is an interference between the first guide groove 82 and the second guide groove 63, thereby increasing the degree of freedom in design without increasing a size of a lens barrel.

In other words, since it is not necessary to consider the interference between the second guide groove 63 formed on the second lens barrel 60 and the first guide groove 82 formed on the outer barrel 80, a position of the second guide groove 63 may be freely designed while maintaining a separation from the first movement pin 62. As an example, as shown in FIG. 9, the second guide groove 63 may be disposed on any one of a first position 631, a second position 632, and a third position 633. In this case, to allow the second movement pin 83 to be engaged with the second guide groove 63 before releasing the first movement pin 62 from the first guide groove 82, it is possible to design the second movement pin 83 of the outer barrel 80 to be disposed on any one of a first position 831, a second position 832, and a third position 833 to correspond to the position of the second guide groove 63. Distances L1, L2, and L3 between the second movement pin 83 and the first guide groove 82 may be designed to be substantially identical to distances L1, L2, and L3 between the first movement pin 62 and the second guide groove 63 of the second lens barrel 60. The position of the second guide groove 63 is not limited to the first, second, and third positions 631, 632, and 633 and may be freely disposed on any position that does not overlap with the first movement pin 62. Accordingly, the position of the second movement pin 83 may be disposed to correspond to the position of the second guide groove 63.

On the other hand, since the first guide groove 82 and the second guide groove 63 are respectively formed on the outer barrel 80 and the second lens barrel 60, which are separate members, it is easy to properly fit the members to each other, thereby improving size accuracy.

Figure 10A:
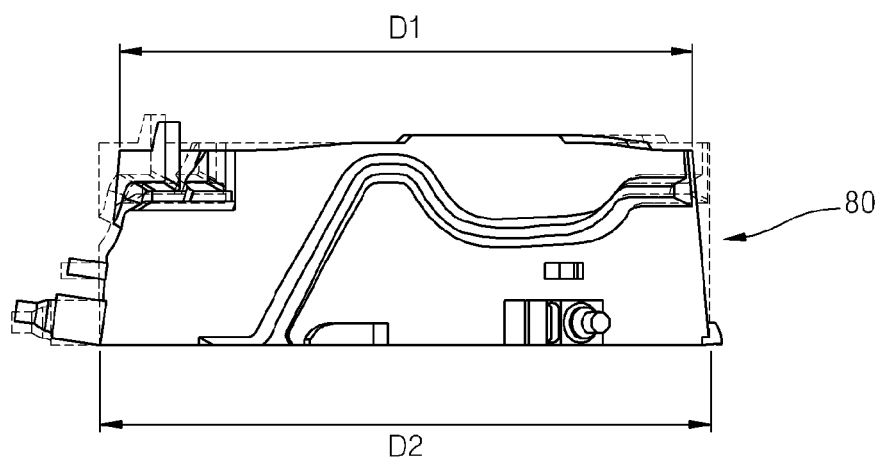
FIG. 10A is a front view conceptually illustrating an example of the outer barrel of the lens barrel assembly of FIG. 4 deformed in a molding process
Figure 10B:
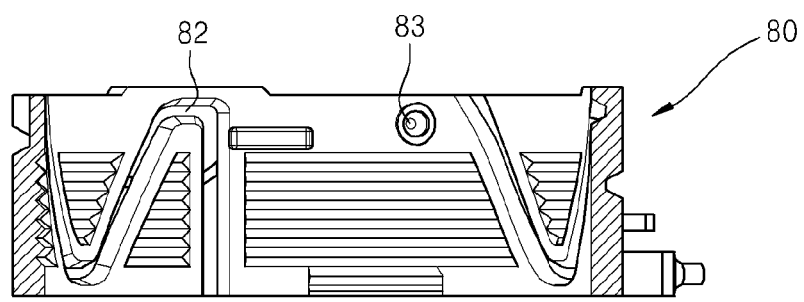
FIG. 10B is a cross-sectional view illustrating the example of the outer barrel of FIG. 10A, a part of which being cut.

A change in sizes of the outer barrel 80 and the second lens barrel 60 may occur during an injection molding process. Particularly, since the outer barrel 80 has a hollow space thereinside, a relatively great change in the size thereof may occur during the injection molding process. For example, as shown in FIG. 10A, in the injection molding process, in case of the outer barrel 80, an upper diameter D1 and a lower diameter D2 may be different from each other. Accordingly, as shown in FIG. 10B, sizes of the first guide groove 82 and the second movement pin 83 formed thereinside may be changed. Due to such changes in size of the outer barrel 80, coupling with the second lens barrel 60 may become loosened or tightened. To compensate for such problems, a groove depth of a guide groove may be adjusted. However, when forming a guide groove including both the first guide groove 82 and the second guide groove 63 on the outer barrel 80, discontinuous groove depths of the first guide groove 82 and the second guide groove 63 should be adjusted at the same time, which could be a very complicated process, thereby increases an amount of processing time and decreases productivity. However, in the present embodiment, since the second guide groove 63 is formed on the second lens barrel 60 with a relatively small change in size, it is not necessary to adjust a groove depth of the second guide groove 63. And the fit with the second guide groove 63 is performed using a simple process of adjusting a projection height of the second movement pin 83. Additionally, since it is only necessary to adjust the groove depth of the first guide groove 82, the adjustment of the groove depth is relatively simplified. That is, in the present embodiment, because the second guide groove 63 is formed on the second lens barrel 60, a proper fit between the outer barrel 80 and the second lens barrel 60 may be performed even though a change of the size of the outer barrel 80 has occurred.

FIGS. 11 to 14 are schematic views illustrating planar figures of the outer barrel 80 and the second lens barrel 60, in which relative movements of a location of the second lens barrel 60 according to a rotation of the outer barrel 80 are shown. In this case, for the convenience of description, the outer guide groove 81 formed on the outer circumferential surface of the outer barrel 80 and the reflecting portion 85 formed on the inner circumferential surface thereof are omitted.

Referring to FIGS. 11 to 14, the first movement pin 62 and the second guide groove 63 are formed on the outer circumferential surface of the second lens barrel 60, and the second movement pin 83 and the first guide groove 82 are formed on the inner circumferential surface of the outer barrel 80.

The first guide groove 82 includes a straight entry portion 82a that extends along the optical axis direction from one edge 80' to another edge 80" of the outer barrel 80, a rear inclined portion 82b that extends along the circumferential direction and is inclined from an end of the straight entry portion 82a to the one edge 80', and a front inclined portion 82c that extends along the circumferential direction and is inclined from an end of the rear inclined portion 82b to the another edge 80". The second guide groove 63 includes an inclined entry portion 63a that extends along the circumferential direction and is inclined from another edge 60" of the second lens barrel 60 to one edge 60' thereof, and a movement restriction portion 63b is formed along the circumferential direction from an end of the inclined entry portion 63a.

Figure 11:
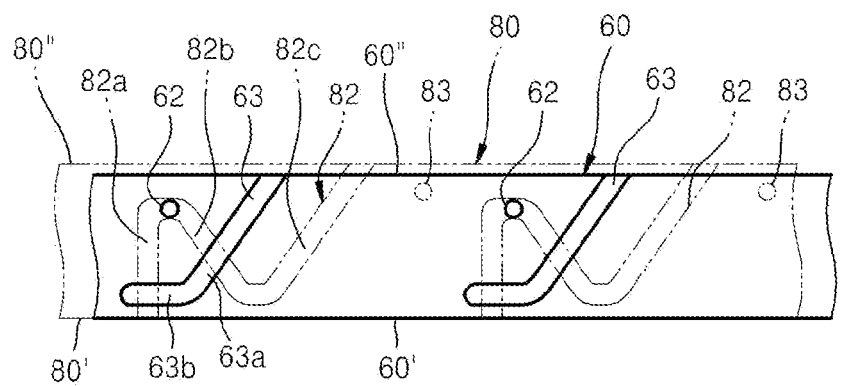
FIGS. 11 to 14 are schematic diagrams illustrating planar figures of the outer barrel and the second lens barrel of FIG. 5, in which relative movements of a location of the second lens barrel according to a rotation of the outer barrel are shown.

Referring to FIG. 11, in a state before the outer barrel 80 rotates, the first movement pin 62 of the second lens barrel 60 enters into the straight entry portion 82a of the first guide groove 82 toward the end of the straight entry portion 82a along the optical axis direction.

Figure 12:
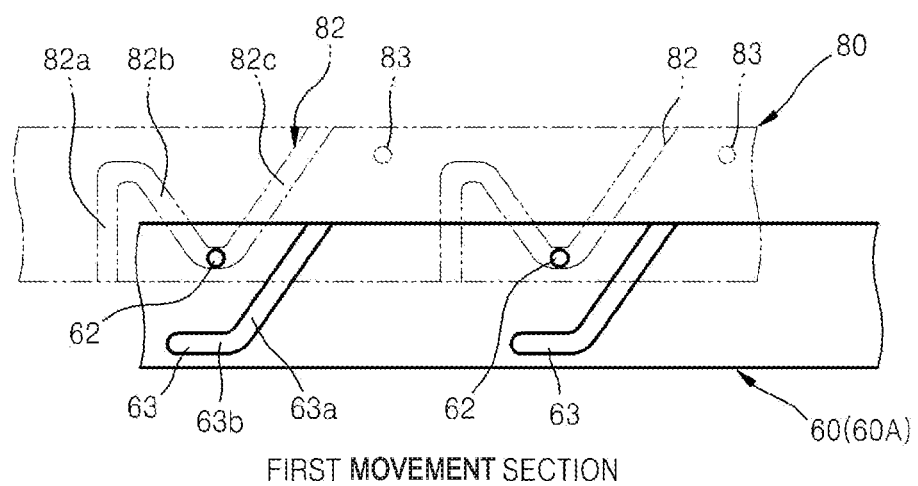

FIG. 12 illustrates an operation state of the second lens barrel 60 in the first movement section. Referring to FIG. 12, while the first movement pin 62 is being engaged with the first guide groove 82, the outer barrel 80 rotates in a first direction, such as clockwise. The first movement pin 62 descends along the rear inclined portion 82b that is connected to the end of the straight entry portion 82a. When the first movement pin 62 is moved to the end of the rear inclined portion 82b, the second lens barrel 60 is located at the wide-angle position 60A, where the distance between the second lens group 50 and the image-forming lens 110 is the shortest. In this case, the second movement pin 83 is not engaged with the second guide groove 63. After that, according to a rotation of the outer barrel 80, the first movement pin 62 ascends the front inclined portion 82c.

Figure 13:
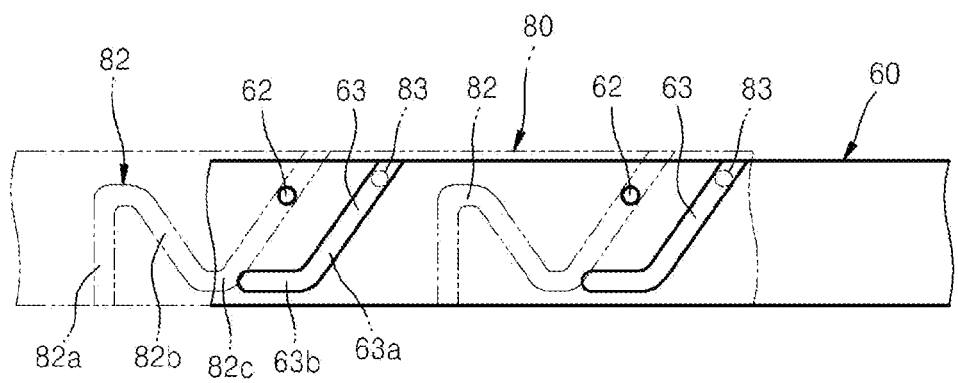

FIG. 13 illustrates an operation state of the second lens barrel 60 in the intersection movement section. Referring to FIG. 13, while the first movement pin 62 is descending along the front inclined portion 82c, the second movement pin 83 enters the inclined entry portion 63a of the second guide groove 63. In other words, before the first movement pin 62 is released from the first guide groove 82, the second movement pin 83 is engaged with the second guide groove 63.

Figure 14:
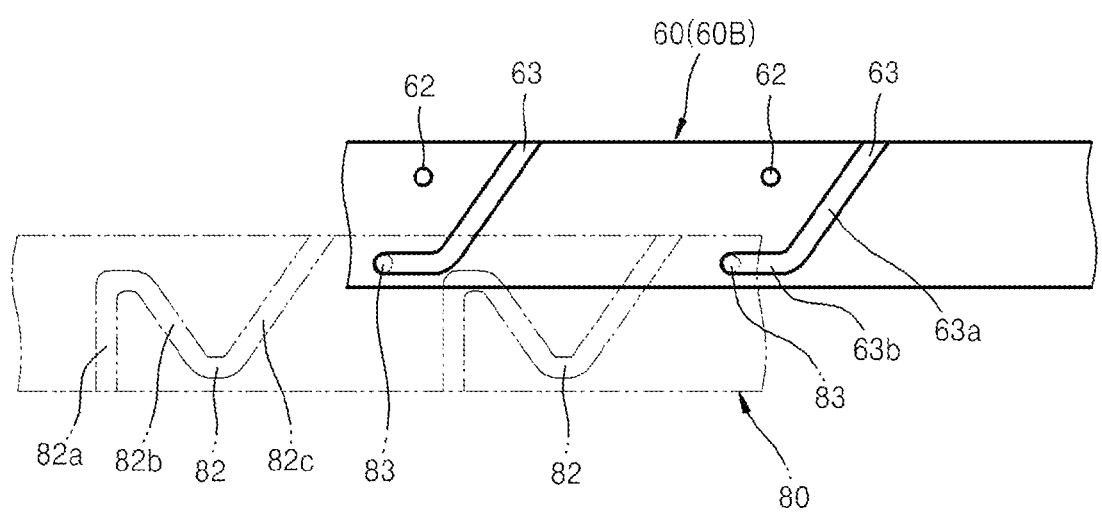

FIG. 14 illustrates an operation state of the second lens barrel 60 in the second movement section. Referring to FIG. 14, when the outer barrel 80 rotates clockwise further, the first movement pin 62 ascends along the front inclined portion 82c and is released from the front inclined portion 82c. While the second movement pin 83 is engaged with the inclined entry portion 63a of the second guide groove 63, the second lens barrel 60 ascends along the inclined entry portion 63a. When the second movement pin 83 passes the inclined entry portion 63a and is moved to the movement restriction portion 63b, the second lens barrel 60 rotates with a certain angle along the movement restriction portion 63b and a movement thereof is restricted. When the second movement pin 83 is located in the movement restriction portion 63b, the second lens barrel 60 is located at the telephoto position 60B, where the distance between the second lens group 50 and the image-forming lens 110 is the longest.

When the outer barrel 80 rotates in a direction opposite to the first direction, such as counterclockwise, the second lens barrel 60 is moved opposite to the described movement. With respect to the opposite movement, it is performed in reverse of the above described movement, and substantial contents thereof are repetitive and will be omitted.

On the other hand, although it has been mainly described that the outer barrel 80 rotates, the invention is not limited thereto. In other words, the outer barrel 80 may rotate without a linear movement or may rotate simultaneously with the linear movement.

The lens barrel assembly 1 and the photographing apparatus may provide enough stroke length for a lens barrel, may reduce a height needed to drive the lens barrel, and may improve degree of freedom in design and size accuracy by forming a guide groove divided into two guide grooves respectively formed on a lens barrel and an outer barrel.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art. The terminology used herein is for the purpose of describing the particular embodiments and is not intended to be limiting of exemplary embodiments of the invention. In the description of the embodiments, certain detailed explanations of related art are omitted when it is deemed that they may unnecessarily obscure the essence of the invention.

The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the invention as defined by the following claims. Therefore, the scope of the invention is defined not by the detailed description of the invention but by the following claims, and all differences within the scope will be construed as being included in the invention.

No item or component is essential to the practice of the invention unless the element is specifically described as "essential" or "critical". It will also be recognized that the terms "comprises," "comprising," "includes," "including," "has," and "having," as used herein, are specifically intended to be read as open-ended terms of art. The use of the terms "a" and "an" and "the" and similar referents in the context of describing the invention (especially in the context of the following claims) are to be construed to cover both the singular and the plural, unless the context clearly indicates otherwise. In addition, it should be understood that although the terms "first," "second," etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

While the invention has been particularly shown and described with reference to exemplary embodiments thereof, it will be understood by those of ordinary skill in the art that various changes in form and details may be made therein without departing from the spirit and scope of the invention as defined by the following claims.

What is claimed is:

1. A lens barrel assembly comprising:
   a lens group;
   a lens barrel that support the lens group and comprises, on an outer circumferential surface thereof, a first movement pin projected outwardly and a second guide groove that is separate from the first movement pin and is extended along a circumferential direction; and
   an outer barrel disposed outside the lens barrel and comprises, on an inner circumferential surface thereof, a first guide groove extended along the circumferential direction to be coupled with the first movement pin, and a second movement pin that is separate from the first guide groove and is projected inwardly to be coupled with the second guide groove,
   wherein the lens barrel is moved in an optical axis direction as the outer barrel rotates, and
   wherein a movement section of the lens barrel comprises a first movement section in which the first movement pin is moved while being guided by the first guide groove, a second movement section in which the second guide groove is moved while being guided by the second movement pin, and an intersection movement section that connects the first movement section with the second movement section.

2. The assembly of claim 1, wherein, in the first movement section, the first movement pin is engaged with the first guide groove, and the second movement pin is not engaged with the second guide groove.

3. The assembly of claim 1, wherein, in the second movement section, the second movement pin is engaged with the second guide groove, and the first movement pin is not engaged with the first guide groove.

4. The assembly of claim 1, wherein, in the intersection movement section, the second movement pin is engaged with the second guide groove before the first movement pin is released from the first guide groove, and the first movement pin is engaged with the first guide groove before the second movement pin is released from the second guide groove.

5. The assembly of claim 4, wherein a distance between the first movement pin and the second guide groove in the circumferential direction is equivalent to a distance between the second movement pin and the first guide groove in the circumferential direction.

6. The assembly of claim 1, wherein the first movement section defines the lens barrel in a wide-angle mode, and the second movement section defines the lens barrel in a telephoto mode.

7. The assembly of claim 1, wherein the lens barrel is moved linearly along the optical axis direction, and the outer barrel rotates around an optical axis.

8. The assembly of claim 7, further comprising a rectilinear motion guide member disposed between the lens barrel and the outer barrel, the rectilinear motion guide member guiding a linear movement of the lens barrel.

9. The assembly of claim 8, wherein the rectilinear motion guide member comprises at least one notch portion extended in the optical axis direction, and
   the lens barrel comprises at least one projection corresponding to the at least one notch portion,
   wherein the projection is moved linearly while being guided by the incision portion.

10. The assembly of claim 1, wherein a plurality of the first movement pins and a plurality of the second guide grooves are formed on the outer circumferential surface of the lens barrel along the circumferential direction, and
    wherein a plurality of the second movement pins and a plurality of the first guide grooves are formed on the inner circumferential surface of the outer barrel along the circumferential direction.

11. The assembly of claim 10, further comprising a reflecting portion with sequential shapes between the plurality of the first guide grooves.

12. A photographing apparatus comprising:
    a lens group;
    a lens barrel that supports the lens group and comprises, on an outer circumferential surface thereof, a first movement pin projected outwardly, and a second guide groove that is separate from the first movement pin and is extended along a circumferential direction;
    an outer barrel disposed outside the lens barrel and comprises, on an inner circumferential surface thereof, a first guide groove extended along the circumferential direction to be coupled with the first movement pin, and a second movement pin that is separate from the first guide groove and is projected inwardly to be coupled with the second guide groove; and
    an imaging device that receives light passing through the lens group and generates an electric signal,
    wherein the lens barrel is moved in an optical axis direction as the outer barrel rotates, and wherein a movement section of the lens barrel comprises a first movement section in which the first movement pin is moved while being guided by the first guide groove, a second movement section in which the second guide groove is moved while being guided by the second movement pin, and an intersection movement section that connects the first movement section with the second movement section.

13. The assembly of claim 1, wherein the entire lens barrel is moved in the optical axis direction as the outer barrel rotates.

14. The apparatus of claim 12, wherein the entire lens barrel is moved in the optical axis direction as the outer barrel rotates.

* * * * *